June 23, 1925.
J. A. NEWBERRY
COFFEE URN
Filed Dec. 31, 1924
1,543,340
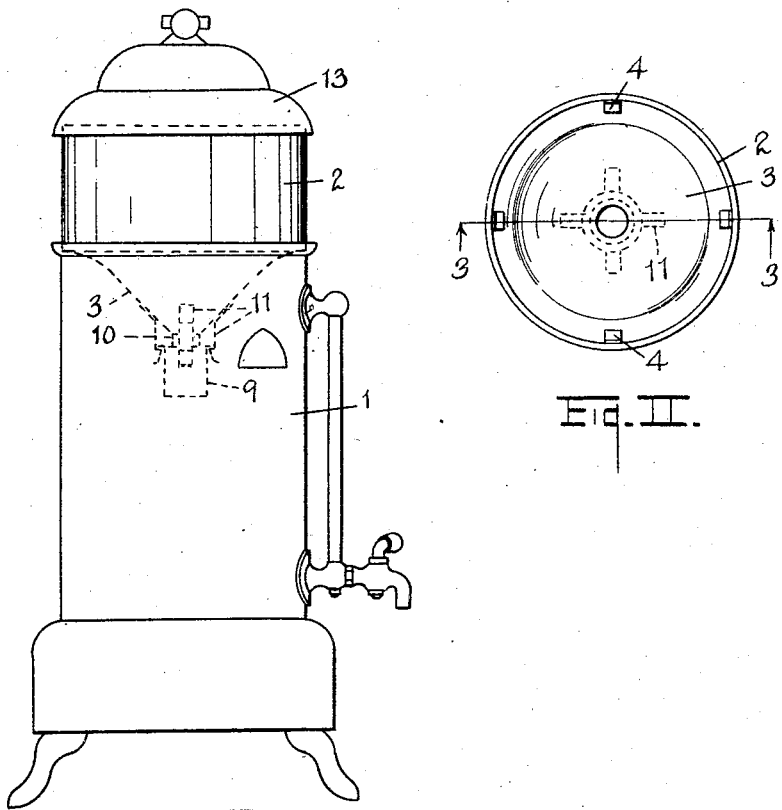
Fig. I.
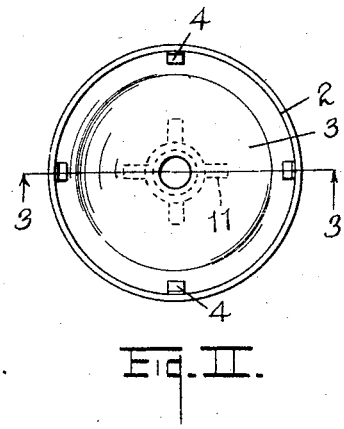
Fig. II.
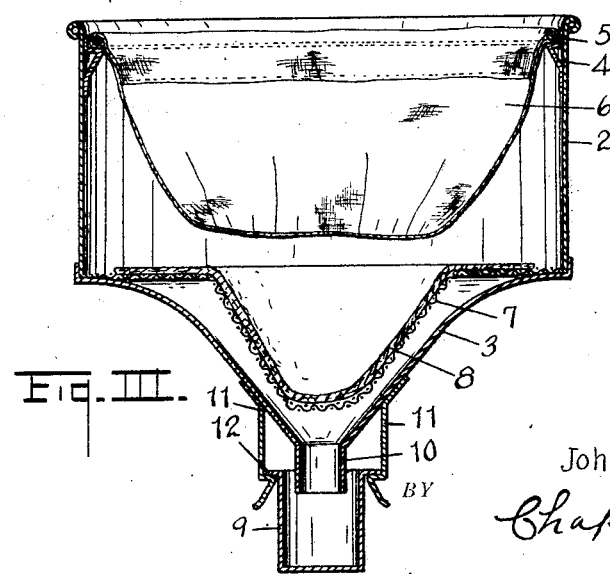
Fig. III.
INVENTOR
John A. Newberry
BY
Chappell & Earl
ATTORNEYS Patented June 23, 1925.

1,543,340

UNITED STATES PATENT OFFICE.

JOHN A. NEWBERRY, OF ALLEGAN, MICHIGAN.

COFFEE URN.

Application filed December 31, 1924. Serial No. 759,028.

*To all whom it may concern:*

Be it known that I, JOHN A. NEWBERRY, a citizen of the United States, residing at Allegan, county of Allegan, State of Michigan, have invented certain new and useful Improvements in Coffee Urns, of which the following is a specification.

This invention relates to improvements in coffee urns.

In making coffee in coffee urns such as are used in restaurants and the like a sack for the coffee is supported in the upper part of the urn and the water is poured through the coffee. It is intended that after the water has been drained through the coffee the sack shall be removed promptly so that the grounds shall not be subjected to the steam which develops an unpleasant taste and objectionable color. It frequently happens, however, that the coffee grounds are left within the urn with the undesirable results indicated.

The main object of this invention is to provide an improved coffee urn by the aid of which a superior quality of coffee may be produced.

A further object is to provide an improved coffee urn in which lack of attention of the operator does not materially affect the quality of the coffee.

Objects pertaining to details and economies of my invention will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing forming a part of this application in which:

Fig. I is a side view of a coffee urn embodying the features of my invention.

Fig. II is a plan view of a removable receptacle constituting a part of my improved coffee urn, the coffee sack and filtering pad and screen being omitted.

Fig. III is a vertical section on a line corresponding to line 3—3 of Fig. II.

In the drawing the sectional view is taken looking in the direction of the little arrows at the end of the section line and similar numerals of reference indicate similar parts in all of the views.

Referring to the drawing, 1 represents the body portion of my improved coffee urn. The details of this and of the heating burner therefor are not illustrated as they form no part of this invention.

I provide a cylindrical receptacle 2 having a funnel shaped bottom 3, the receptacle being adapted to constitute a cover for the urn and when arranged thereon the funnel shaped bottom depends centrally into the urn as illustrated by dotted lines in Fig. I.

The receptacle is provided with internal rests 4 for the supporting ring 5 of the coffee sack 6. I also preferably provide a filtering pad supporting member 7 which is conformed to depend into the funnel shaped bottom but is supported out of contact with the walls thereof. The filtering pad 8 is arranged in this support so that water flowing or draining through the coffee sack is filtered by this pad.

The water seal receptacle 9 is mounted upon the receptacle to embrace the discharge tap 10 of the bottom, a plurality of spring fingers 11 being provided to engage the outwardly projecting rim 12 of the receptacle. The cover 13 is adapted as a cover both for the receptacle 2 and the urn proper, it preferably being the usual cover provided for the urn.

With the parts thus arranged the coffee, powdered or finely ground, is placed in the sack 6 and the disired amount of hot water is poured therethrough, the water being filtered through the pad 8. The seal receptacle or cup 9 being filled with liquid forms a seal for the receptacle so that the steam cannot enter the receptacle or come into contact with the grounds in the sack 6.

As heretofore stated, careless operators frequently leave the coffee sack within the urn so that it is subjected to the steam which causes all the deleterious properties, such as caffeine, to become extracted therefrom and, further, the sack being improperly cleaned or sterilized soon imparts to the coffee an objectionable flavor.

Further, the continued subjecting of the coffee and its container to the action of the steam results in an objectionable color.

In my improved coffee urn access of the steam to the coffee grounds is entirely cut off and the receptacle may be left in position on the urn as long as desired without deleterious results. The cover 13 is adapted either as a cover for the receptacle or for the urn when the receptacle is removed.

A further advantage is that by removing the receptacle the pad in the interior of the receptacle is easily removed so that there is no occasion for carelessness in this respect on the part of the operator.

Having thus described my invention what I claim as new and desire to secure by Letters Patent, is:

1. The combination with a coffee urn, of a receptacle adapted to constitute a cover for said urn; said receptacle having a funnel shaped bottom, a seal receptacle removably mounted on said funnel shaped bottom with its upper edge in a plane above the end of the bottom, a coffee sack removably suspended within said receptacle, a filter support depending into said funnel-shaped bottom in spaced relation to the walls thereof, a filtering pad on said support, and a cover for said urn adapted as a cover for said receptacle, or for the urn.

2. The combination with a coffee urn, of a receptacle adapted to constitute a cover for said urn; said receptacle having a funnel shaped bottom, a seal receptacle removably mounted on said funnel shaped bottom with its upper edge in a plane above the end of the bottom, a coffee sack removably suspended within said receptacle, and a cover for said urn adapted as a cover for said receptacle, or for the urn.

3. The combination with a coffee urn, of a receptacle adapted to constitute a cover for said urn; said receptacle having a funnel shaped bottom, a seal receptacle arranged with its upper edge in a plane above the end of the bottom, a coffee sack suspended within said receptacle, a filter support screen depending into said funnel-shaped bottom, and a filtering pad supported by said screen.

4. The combination with a coffee urn, of a receptacle adapted to constitute a cover for said urn; said receptacle having a funnel shaped bottom, a seal receptacle arranged with its upper edge in a plane above the end of the bottom, and a coffee sack suspended within said receptacle.

In witness whereof I have hereunto set my hand.

JOHN A. NEWBERRY. [L. S.]